(12) United States Patent
Picoult et al.

(10) Patent No.: US 6,801,932 B1
(45) Date of Patent: Oct. 5, 2004

(54) METHOD AND SYSTEM FOR REMOTE RETRIEVAL OF DOCUMENTS

(75) Inventors: Cheryl L. Picoult, Monroe, CT (US); John H. Winkelman, Southbury, CT (US); Kevin L. Strobel, Fairfield, CT (US); James R. Norris, Jr., Danbury, CT (US); John W. Rojas, Norwalk, CT (US)

(73) Assignee: Pitney Bowes Inc, Stamford, CT (US)

(*) Notice: Subject to any disclaimer, the term of this patent is extended or adjusted under 35 U.S.C. 154(b) by 738 days.

(21) Appl. No.: 09/707,561

(22) Filed: Nov. 7, 2000

(51) Int. Cl.[7] ............................................. G06F 15/16
(52) U.S. Cl. ........................ 709/206; 709/203; 709/205; 379/88.14; 455/424; 455/425
(58) Field of Search ................................. 709/203, 205, 709/206; 379/88.14; 455/4.1, 4.2, 424, 425

(56) References Cited

U.S. PATENT DOCUMENTS

| | | |
|---|---|---|
| 5,068,888 A | 11/1991 | Scherk et al. |
| 5,168,444 A | 12/1992 | Cukor et al. |
| 5,327,486 A | 7/1994 | Wolff et al. |
| 5,459,458 A | 10/1995 | Richardson et al. |
| 5,513,126 A | 4/1996 | Harkins et al. |
| 5,633,932 A | 5/1997 | Davis et al. |
| 5,692,048 A | 11/1997 | Gormish et al. |
| 5,787,149 A | 7/1998 | Yousefi et al. |
| 5,790,790 A | 8/1998 | Smith et al. |
| 5,802,460 A | 9/1998 | Parvulescu et al. ............ 455/92 |
| 5,873,077 A | 2/1999 | Kanoh et al. |
| 5,966,663 A | 10/1999 | Gleason ....................... 455/466 |
| 5,983,073 A | 11/1999 | Ditzik |
| 6,002,752 A | 12/1999 | Park |
| 6,006,087 A | 12/1999 | Amin ......................... 455/413 |
| 6,008,727 A | 12/1999 | Want et al. ............... 340/572.1 |
| 6,008,921 A | 12/1999 | Brusky et al. |
| 6,061,448 A | 5/2000 | Smith et al. |
| 6,119,137 A | 9/2000 | Smith et al. |
| 6,134,433 A | 10/2000 | Joong et al. ................. 455/417 |
| 6,169,805 B1 | 1/2001 | Dunn et al. |
| 6,184,996 B1 | 2/2001 | Gase |
| 6,212,550 B1 * | 4/2001 | Segur ......................... 709/206 |
| 6,216,158 B1 | 4/2001 | Luo et al. |
| 6,233,684 B1 | 5/2001 | Stefik et al. |
| 6,240,183 B1 | 5/2001 | Marchant |

(List continued on next page.)

FOREIGN PATENT DOCUMENTS

| | | |
|---|---|---|
| EP | 1045574 A1 | 10/2000 |
| EP | 1146684 A2 | 10/2001 |
| WO | WO 00/79732 A1 | 6/2000 |

*Primary Examiner*—Zarni Maung
*Assistant Examiner*—Jinsong Hu
(74) *Attorney, Agent, or Firm*—Kimberly S. Chotkowski; Ronald Reichman; Angelo N. Chaclas

(57) ABSTRACT

The present invention is directed to a method and system for remote receipt of a message, such as a telephone, e-mail, facsimile or paper message. A server or data center is provided for receiving messages from a sender communicating with a recipient mobile device. The mobile device is then prompted to notify the recipient that a message is waiting. If the recipient desires to receive the message, he/she indicates this on his/her mobile device. The mobile device and the device which will receive the message, i.e., the destination device, are provided with a tag for wireless communication. The message recipient is prompted to bring the mobile device in close enough proximity to the destination device such that the tag sends information about the destination devise to the mobile device. The mobile device communicates the information via wireless communications means with the data center. The data center then determines if any translation or transcoding of the original message is required in order for the destination device to receive the message in proper format. Once transcoding or translation is effected, the message is routed to the destination device for output.

27 Claims, 8 Drawing Sheets

U.S. PATENT DOCUMENTS

| | | |
|---|---|---|
| 6,256,378 B1 | 7/2001 | Iggulden et al. |
| 6,272,530 B1 * | 8/2001 | Horiuchi et al. ............ 709/206 |
| 6,289,212 B1 | 9/2001 | Stein et al. |
| 6,289,389 B1 | 9/2001 | Kikinis |
| 6,297,891 B1 | 10/2001 | Kara |
| 6,314,454 B1 * | 11/2001 | Wang et al. ................ 709/206 |
| 6,378,070 B1 | 4/2002 | Chan et al. |
| 6,389,115 B1 * | 5/2002 | Swistock ................. 379/88.12 |
| 6,460,073 B1 * | 10/2002 | Asakura ..................... 709/206 |
| 6,553,240 B1 | 4/2003 | Dervarics |
| 6,591,367 B1 | 7/2003 | Kobata et al. |
| 6,674,453 B1 | 1/2004 | Schilit et al. |
| 2001/0037462 A1 | 11/2001 | Bengtson |

* cited by examiner

METHOD AND SYSTEM FOR REMOTE RETRIEVAL OF DOCUMENTS

RELATED APPLICATION

The present application is related to U.S. application Ser. No. 09/727,893 entitled "Method and System for Remote Retrieval of Messages Using Spontaneous Networking Technology" filed Nov. 30, 2000, U.S. Pat. No. 6,654,601 and assigned to the assignee of the present invention.

The present application is related to U.S. application Ser. No. 09/728,237, entitled "Method and System for Remote Printing of Documents", filed Nov. 30, 2000, U.S. Pat. No. 6,744,528 and assigned to the assignee of the present invention.

FIELD OF THE INVENTION

The invention disclosed herein relates generally to the field of messaging. More particularly, the present invention relates to a system and method for sending and retrieving messages remotely. Specifically, this invention implements wireless technology and document transformation to communicate a message to a mobile recipient for remote access.

BACKGROUND OF THE INVENTION

In today's rapidly paced society, professional and personal demands on messaage technologies, such as voice mail, e-mail, facismile and pagers, have greatly increased. The development of this technology, in turn had increased demands on mobile people who rely on these messaging devices for a variety of business and social communications. Specifically, these expectations have forced the mobile professional to demand the ability to receive messages regardless of time, location, or availability of messaging devices. According to a recent study by Pitney Bowes Inc. of Stamford, Conn., a typical business professional receives 169 messages a day. Many of these messages are delivered using some form of electronic and mobile communication such as cellular telephones, facsimiles, analog/digital telephone, pagers, e-mail transmission, and personal data assistants. These messages help determine the mobile professional's daily plans, keep him/her in contact with his/her community and enable him/her to accomplish his/her professional and personal goals.

Users, recognizing the capabilities of these devices, have relied on these devices such that they have become nearly indispensable tools for many businesses and individual consumers. Specifically recognized as invaluable are the inherent capabilities of a facsimile as an effective means of quickly and efficiently transmitting many types of documents from one known and specified location to another known and specified location. Facsimile machines are indispensable global tools, because they are used throughout the world and are accessible by and compatible with any other facsimile in the world. In addition, the use of facsimile machines has significantly improved the speed of transmittal of documents as compared to the sending of such a document through the postal services and/or various other express courier services, which, in general, require overnight delivery. Furthermore, facsimile machines have eased the travel burden on mobile professionals by eliminating the total number of printed documents they must carry to offsite meetings. With the aid of facsimile machines, any forgotten necessary documents may be retrieved by a simple facsimile.

Also in recent years, photocopiers have become more than just a reproduction machine. Photocopiers, which exist in virtually every office environment, have integrated the capabilities of printing and the flexibility of facsimile to become a valuable office tool. These machines have opened a new channel for communication which will enable mobile professionals to operate more efficiently and effectively.

In typical document messaging systems, a person desiring to send a print form of a message, such as a facsimile, must know the physical location of the intended recipient in order to insure that the intended recipient will be the actual recipient of the transmitted message. These systems require the message sender to first contact the intended recipient to determine a location, a time and a facsimile number where a message may be received. If the message is a confidential communication, the sender also must know that the recipient will be present at the precise time the sender transmits the facsimile. If the recipient is not physically present at the facsimile machine, the intended recipient may never receive the message, and/or any confidentiality may be broken.

In another messaging scenario where an individual desires to access and print his/her e-mail messages remotely using his/her laptop computer, the recipient first must locate a telephone line to enable access to the recipient's e-mail. The recipient must then locate and access either a dedicated printer or a networked printer in order to print the e-mail. Often, the access to a company's network is protected, and visitors are not authorized to use the network without a cumbersome approval process. Moreover, if the e-mail has accompanying attachments, the intended recipient must also insure that the attachments are in a software program format which is loaded on the accessed network or that the program is present on the intended recipient's computer. Meeting these requirements is both time consuming and, often, unattainable.

In another messaging scenario, the sender of the message may choose to send the recipient an e-mail message, a voice message, a facsimile or even a paper message, while the recipient prefers to receive the message in a print format. The present systems do not allow the flexibility to easily enable this access to messages and documents. In most systems, the lack of integration between an input device and a destination device means that a message recipient must separately utilize a variety of messaging and delivery systems in order to access the desired information. In a voice messaging scenario, this often means that the recipient must call into a phone system to check whether any voice messages exist, manually set call forwarding to a network for translation into a readable form, and then remotely log on to a network to receive the message.

In another scenario, a message recipient may choose to access his/her messages through his/her personal data assistant; however, the personal data assistant may not have enough memory to reproduce the entire e-mail and/or the attachments. This scenario requires the recipient to contact either his/her assistant to arrange a time and location to have the facsimile sent, or it requires the recipient to contact the message originator himself or herself to have the documents directly transferred. If the message is a voice mail sent to a recipient and the recipient desires a print version, the recipient either must have his/her assistant transcribe the voice message, or the recipient must employ voice to text conversion. Again, in order for the recipient to actually receive a physical print copy of the voice text, the recipient must arrange for a facsimile transmission. The above example presents some of the problems associated with remote retrieval of document. It is to be appreciated that many such examples exist.

One example of a solution to this problem has been disclosed by EFAX.COM™, a Delaware corporation having headquarters in Menlo Park, Calif. EFAX.COM™ produces a product which enables a mobile professional to receive facsimiles and voice mail messages using a wireless device. However, the EFAX.COM™ product requires that the recipient know the facsimile number of the machine to be used for printing and further requires the sender to manually enter that number into the sender's wireless device. Furthermore, the EFAX.COM™ sends facsimile to facsimile; however, any voice transmission is sent to an e-mail as an attached audio file using a proprietary format.

Therefore, there now exists a requirement to enable the mobile professional the flexibility and ease of access to his/her messages at any time and location which have originated from any messaging format.

SUMMARY OF THE INVENTION

The present invention is directed to a method and system for remote receipt of a message, such as a telephone, e-mail, facsimile or paper message. This invention allows mobile people such as telecommuters, sales people, professional people having multiple offices; business travelers; professionals who do not have a dedicated assistant; and anyone having a message flow, the ability to receive their messages at a variety of locations in a variety of formats with ease and flexibility. In today's environment, even when professionals strive for a paperless office, there remains a need for paper documents. Paper is a collaborative media and, as such, fosters innovation, design and teamwork. Paper is also a legal media often required when finalizing contracts. Finally, paper is a more permanent media often used for storing knowledge.

Therefore, it is often desirous for mobile professionals to have at their fingertips a plethora of information which may be received in a variety of tangible media without regard to the recipient's location or the format in which the document was created. Paper also finds a significant use as a translation. In other words, a message may be sent by paper yet received in an electronic form, or a message may be communicated in an electronic form and received in a printed form. Furthermore, a message may be sent in a paper form, transmitted to its destination in electronic form, and then printed into a paper format. The present invention provides these mobile professionals the ability to receive their documents and messages, unrestricted and unlimited, by time, location, and document format.

This invention incorporates aspects of "unified mail", "unified messaging", and "universal messaging" to result in a remote messaging solution. "Unified messaging" transmission is the ability to create and respond to multimedia messages with accuracy to the originator from a telephone, a personal computer or other hand-held device. "Unified mail" is the ability to store messages of all media type: voice, facsimile, e-mail, video, paging, in a single mailbox with accessibility by a personal computer, a telephone, or other hand-held device. "Universal messaging" is the ability to create any type of message and to send the message without regard to the recipient's mailbox requirements.

The present invention provides a server or data center for receiving messages from a sender. The message or messages may be voice, facsimile, e-mail, video messages or other electronic form of data. The data center communicates with an intended message recipient's mobile device, such as a pager, personal data assistant, cellular phone or laptop computer. The mobile device is then prompted to indicate to the recipient that a message has been sent, and that the message is stored at the data center awaiting delivery. The message recipient determines where, when and if he/she desires to retrieve the message. The recipient may choose to receive one or more messages and selected attachments, regardless of the format, in a single transmission by selecting those messages on his/her mobile device. This requires the system to place only one telephone call to send/receive a myriad of messages. The mobile device is equipped with a wireless communications capability such as IrDA, Rf, and ultrasonic or any wireless communication. Therefore, the users may "transparently" log in to the system via a hand-held device without specifically typing in a user name and a password. The message recipient merely brings the mobile device within wireless range to a destination device which has also been provided with a tag capable of communication through corresponding technology. The system will be described herein as using IrDA communication.

Included in the IrDA tag is information about the destination device such as the address of the destination device and the type of device. The destination address may be, for example, a facsimile number, internet address, or server address. The IrDA tag communicates the address to the mobile device which then forwards the address, via wireless communications means, to the data center. The data center then determines if any translation or transcoding of the original message is required in order for the destination device to receive the message in comparable format with the form of the desired destination device. For example, the message sent may be an e-mail, voice communication or by paper (in facsimile or scanned form), and the desired receipt may also be in any of the same variety of formats. Therefore, if the message sent is in a different format in which it is to be received, translation or transcoding may be required. Once transcoding or translation is effected, the message is routed to the identified destination device, which then outputs the message. This system and method of message transmission occurs such that it appears to the recipient that he/she has "beamed" the message directly from his/her mobile device to the destination device. The system also has the capability of retrying messaging transmissions intelligently. For example, confirmation of delivery may be sent to the original sending party in order to provide assurance that certain messages have been received. Once a facsimile has been received by the recipient, the system may send a confirmation of delivery by a variety of devices such as a facsimile. In addition, if the recipient did not receive the facsimile within a designated period of time, then a message may be sent to the original sender indicating non-receipt.

According to another aspect of the present invention, the recipient may be required to reply to a notification of a message or to actual receipt of a message within a specified period of time. If the recipient does not reply to the notification within a specified period of time, then the notification is re-sent. This may be implemented, for example, when urgent messages are delivered via pager, and the recipient's pager is turned off. In this scenario, the message will be re-sent either until the page is heard by the recipient, or until a specified period of time has elapsed when a message indicating delivery failure may be sent to the original sender.

User notification device preferences and document receipt preferences may also be programmed at the data center. For example, a message sent to the data center for recipient may first be sent to recipient's pager, then to recipient's cellular phone, and perhaps next to a personal data assistant.

Document receipt preferences may include recipient itinerary stored at the data center programmed to send the document based on the predetermined recipient's itinerary. For example, if the recipient knew his/her exact schedule for a certain time frame, the data center or mobile device would route the documents accordingly. The recipient may override this feature at anytime.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
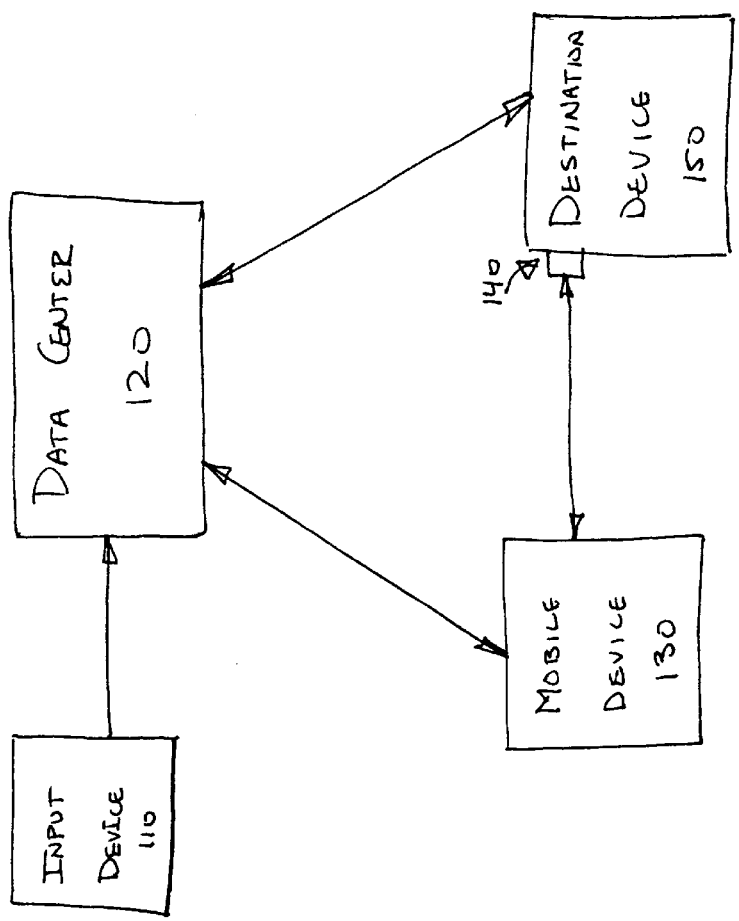
FIG. 1 is a diagram of the overall system of the present invention.

In describing the present invention, reference is made to the drawings, wherein there is seen in FIG. 1, an overall diagram of the remote messaging system of the present invention, designated as reference numeral 100. System 100 includes input device 110 for sending a message to data center 120. Input device 110 may be a facsimile, a computer, a telephone, or photocopier. The preferred embodiment is shown with having a message sent directly to data center 120; however, it is to be understood that the message may first be sent to a recipient's default destination such as e-mail, facsimile or voice, which then routes to data center 120. The messages sent via input device 110 may be voice, e-mail, facsimile, or any other message format, which is already in or may be converted to electronic form. Data center 120 stores the message, identifies the intended recipient, and sends a notification to a recipient via mobile device 130 that a message has been received at data center 120. Data center 120 may also determine the recipient's preferences for receiving notice that a message has been sent. Furthermore, data center 120 performs any translation or transcoding that may be required for communicating the document to be received at the destination device. Mobile device 130 may be a lap top computer, a personal data pager, cell phone or any other mobile wireless device. System 100 further includes destination device 150 having a wireless communication tag 140 for communicating between the mobile device and the destination device 150 to receive the destination address of the destination device. However, in another embodiment, notification that a message has been sent to data center 120 may be made to the recipient via any device such as a facsimile or voice. A mobile device, however, is required to communicate with wireless communication tag 140 to send the destination address to data center 120. Destination device 150 may be any means of receiving a printed message such as a facsimile, photocopier and a printer.

Figure 2:
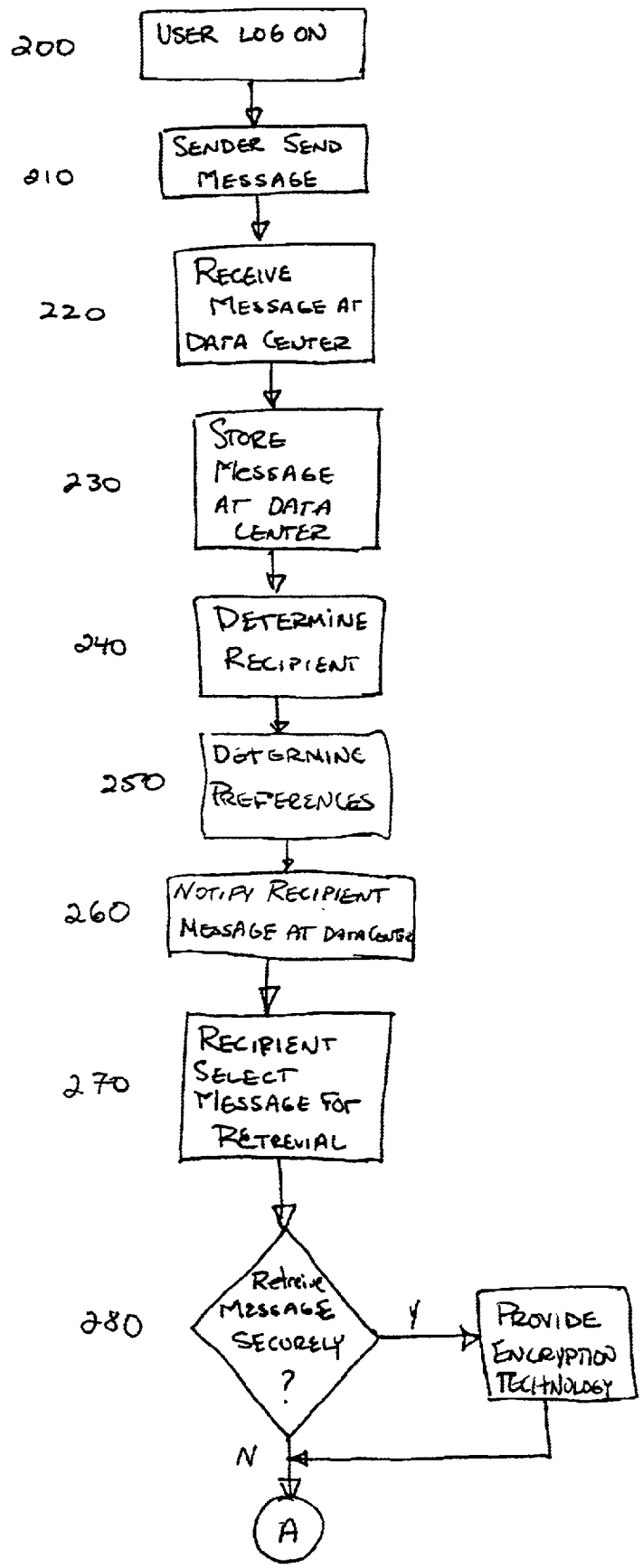
FIG. 2 is a flow chart depicting the method of the present invention.

Now turning to FIG. 2, there is shown one embodiment of the method flow of the present invention. Beginning at step 200, the message sender logs on to the system. At step 210, a message is sent. The system may be designed such that the message is sent directly to a recipient's home address (i.e., the recipient's home facsimile number, e-mail, or voice mail system). In turn, the home machine routes the message to data center 120. The sender also may connect directly with a website or data center to send the message directly to data center 120. At step 220, a message is received at data center 120. At step 230, data center 120 stores the message, and at step 240 reads the message and determines the intended recipient.

Continuing at step 250, data center 120 determines whether any individual user preferences have been stored in the data center 120. The user preferences guide the data center 120 as to how the recipient receives the notification and delivery notice of his/her messages, instructs priority of sending the messages, whether automatic delivery for certain documents or destinations is requested, and perhaps even screens the messages based on sender ID, message content or other filter settings. Furthermore, the preferences may indicate to circumvent the notification and directly send the message to a destination address. The specific destination address may be based upon an itinerary communicated to data center 120, or it may be a default device. It is to be appreciated that if delivery is made based upon an itinerary, notice also may be made to the recipient who, at any time, may override the database itinerary parameters.

The method flow chart continues at step 260 where data center 120 sends to recipient's determined preferred mobile device 130 a notification that a message has been sent, and it is stored in data center 120. At step 240, recipient indicates on mobile device 130 which message recipient desires to receive. At step 270, recipient selects a message for delivery. At step 280, the recipient may be queried as to whether or not the recipient would like the message to be sent securely. If the answer to the query at step 280 is "no", then the method progresses directly along path A. If, however, the answer to the query at step 280 is "yes," then the method proceeds to step 290 where the document is processed for secure transmission. Secure transmission may be effected in a variety of methods such as by public key, private key encryption or the like. Such security techniques are well known in the art of secure messaging; therefore, a detailed description of these secure transfer technologies is not required for an understanding of this invention. The method then progresses from step 290 to continue along path A.

Figure 3:
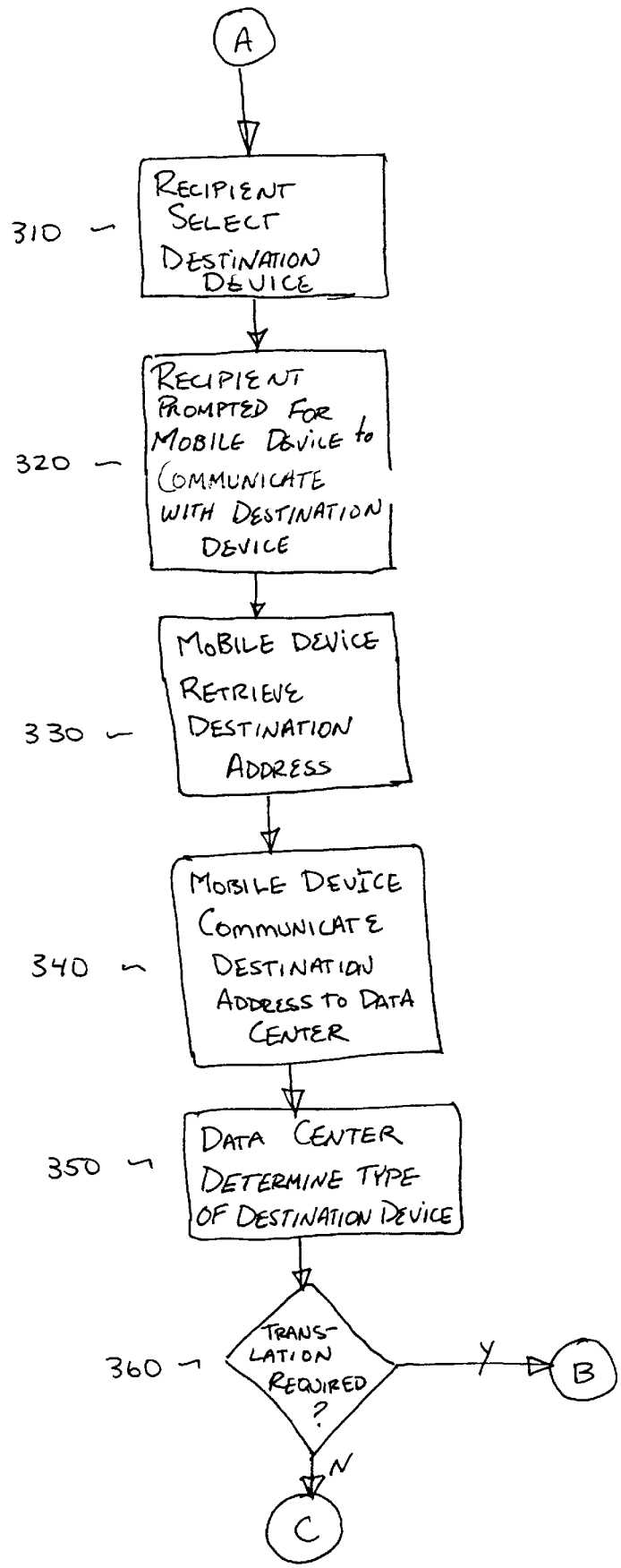
FIG. 3 is a continuation of the method flow of FIG. 2.

The method flow re-enters FIG. 3 along path A and continues to step 310 where the recipient selects the destination device for receiving the message. The device may be a facsimile machine, a photocopier, or a printer having a wireless communication tag 140 affixed thereon for sending and receiving information relevant to destination device 150. The method flow proceeds to step 320 where the user is prompted to establish communication by positioning mobile device 130 within wireless communication range to wireless communication tag 140 located on destination device 150. At step 330, mobile device 130 receives the destination address from wireless communication tag 140; and at step 340, mobile device 130 communicates the destination address to data center 120. The method flow progresses to step 350 where data center 120 determines the format required by destination device 150. At step 360, the method flow queries as to whether or not the message is in a format that is compatible to the destination device. If the answer to the query at step 360 is "yes," then the method flow progresses along path B.

Figure 4:
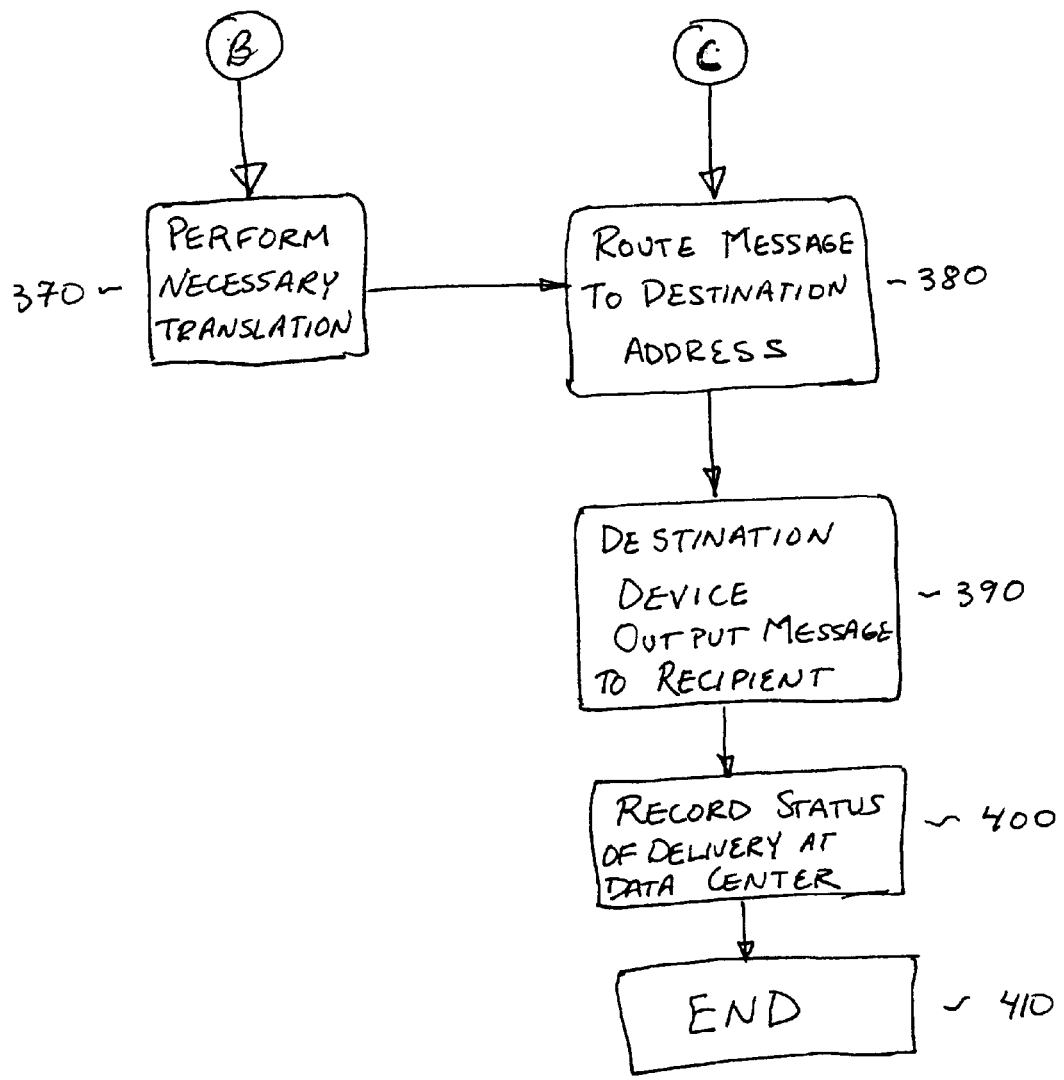
FIG. 4 is a continuation of the method flow of FIG. 3.

Now turning to FIG. 4, the method flow re-enters path B and continues at step 370, where the necessary translation or transcoding is conducted and then to step 380. If, however, at step 360 the answer to the query is "no," then the method continues along path C to Step 380 of FIG. 4, where the data center routes the message to the destination address. The method proceeds to step 390 where the destination device outputs the message to the recipient; and at step 400, the status of delivery is communicated to the data center. The method flow ends at step 410.

Figure 5:
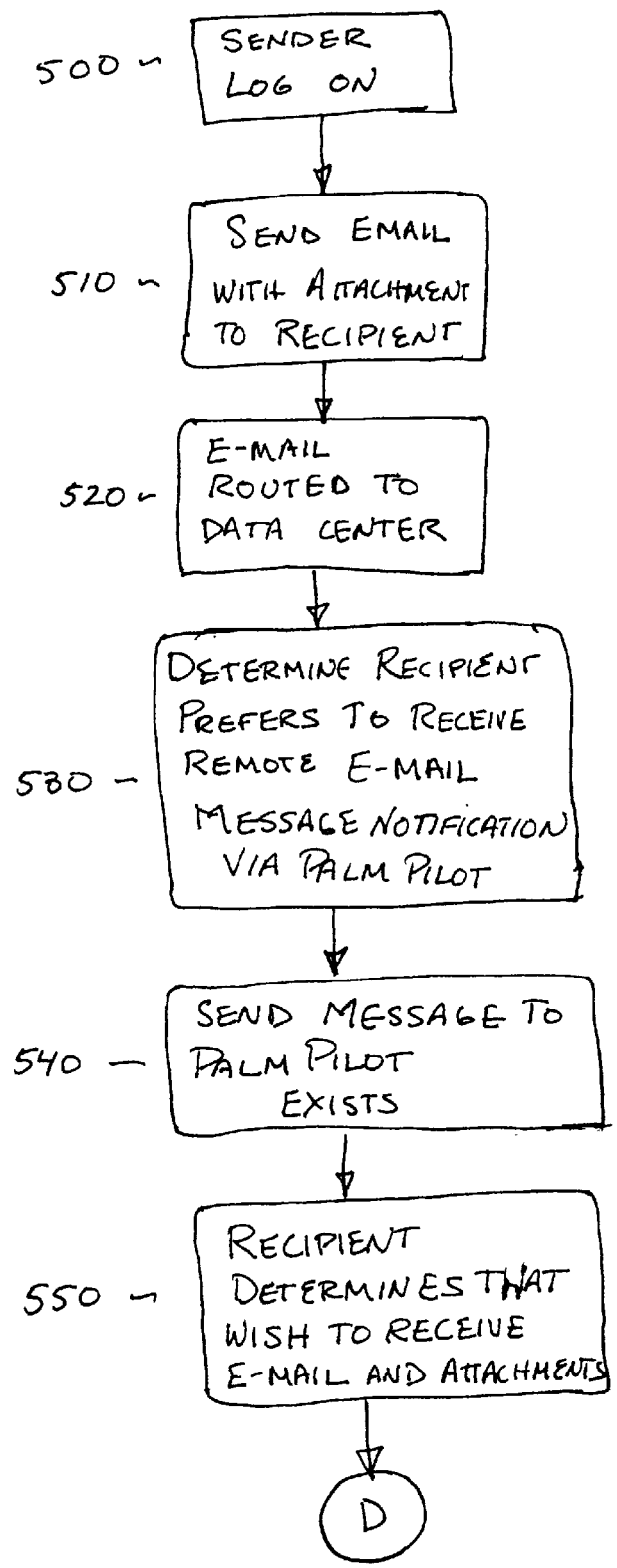
FIG. 5 is a flow chart depicting the method of a specific embodiment of the present invention.

Now turning to FIG. 5 is another embodiment of a method flow of the present invention detailing one embodiment of the present invention wherein the sender transmits an email, and the recipient desires to retrieve a facsimile. The method flow begins at step 500 where the message sender logs onto his/her e-mail messaging system. The method flow continues at step 510 where the email is sent through a website or a server to data center 120. In either case, data center 120 receives the message. The user may be sending a message to the user's e-mail system which has then been directed to forward all received e-mail messages at step 520 to data center 120. The method progresses to step 530 where data center 120 stores the messages. At step 540, data center 120 determines the recipient and any preferences designated by the recipient. These preferences indicate the recipient's desired method for receiving notification that a message has been sent to the data center and is awaiting delivery. For example, if a recipient typically carries a cellular telephone, then the recipient may direct the data center to always notify the recipient that recipient has received a message by using his/her cellular telephone. If, however, the recipient prefers to carry a personal data device or a pager, the recipient may designate these devices as preferred mobile devices. The recipient may also indicate in the preferences certain priorities for messages, or recipient may specify call screening choices. In describing this embodiment of the present invention, the recipient has decided to receive notification that a message has been sent through his/her personal data assistant. The method then proceeds to step 550 where data center 120 sends a notification to the recipient's palm pilot that a message is waiting at the data center for delivery. At step 560, the recipient selects certain email messages and certain attachments to be sent to a destination device. The method then proceeds to connector D.

Figure 6:
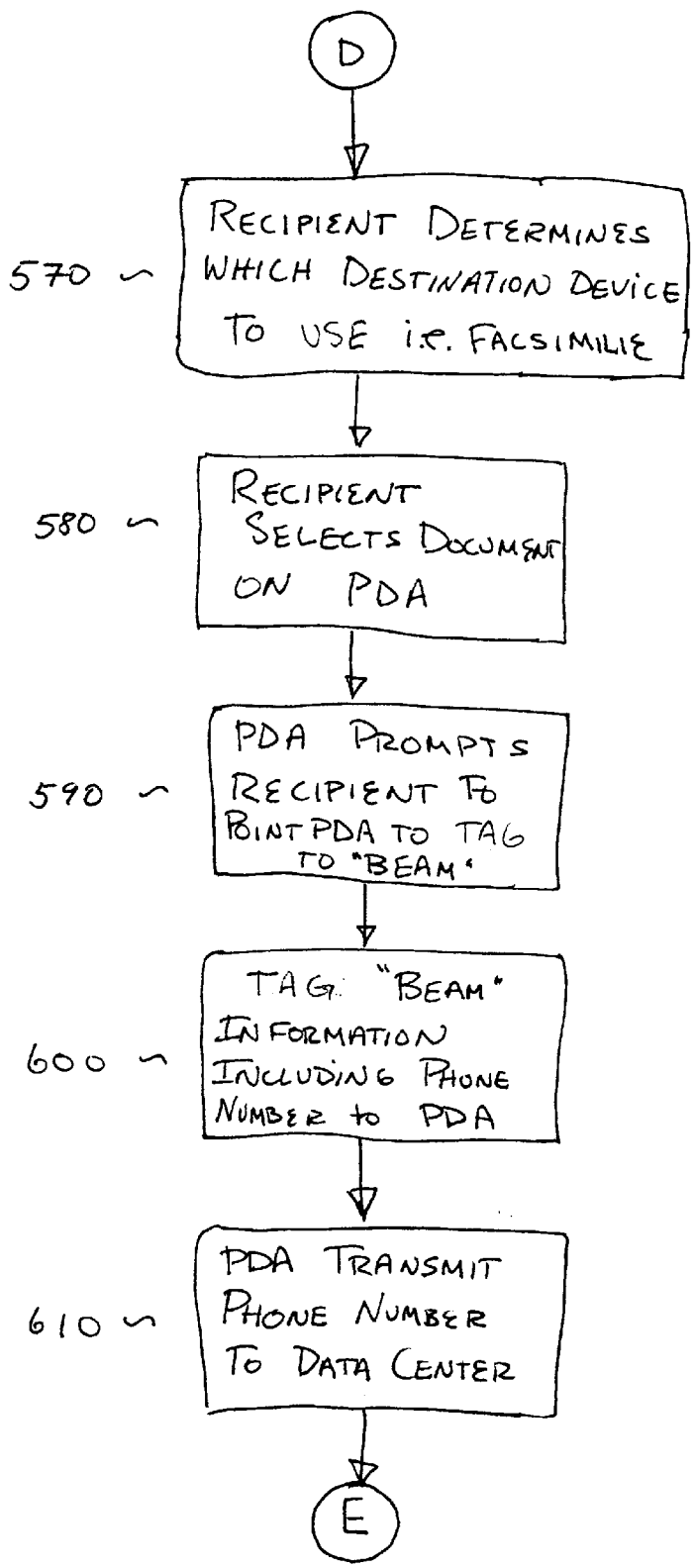
FIG. 6 is a continuation of the method flow of FIG. 5.

Now turning to FIG. 6, the method re-enters the method flow at path D and continues along to step 570 where the recipient chooses destination device 150 for receiving the message. In this embodiment, the destination device for receiving the message is a facsimile. At step 580, the recipient selects the document to be received. At step 590, the recipient is prompted to direct the personal data assistant to be placed within wireless communication range to facsimile device 150. Facsimile 150 is equipped with a wireless communication tag 140 for communicating with the personal data device. Wireless communication tag 140 may operate by a variety of wireless methods, for example IrDA, Rf, ultrasonic or any other wireless technology. At step 600, wireless communication tag 140 communicates with personal data device 130 and sends to personal data assistant 130 the destination address of facsimile 150. In this embodiment, the destination address is the facsimile number. At step 610, personal data assistant 130 transmits the facsimile number to data center 120. The method continues to connector E.

Figure 7:
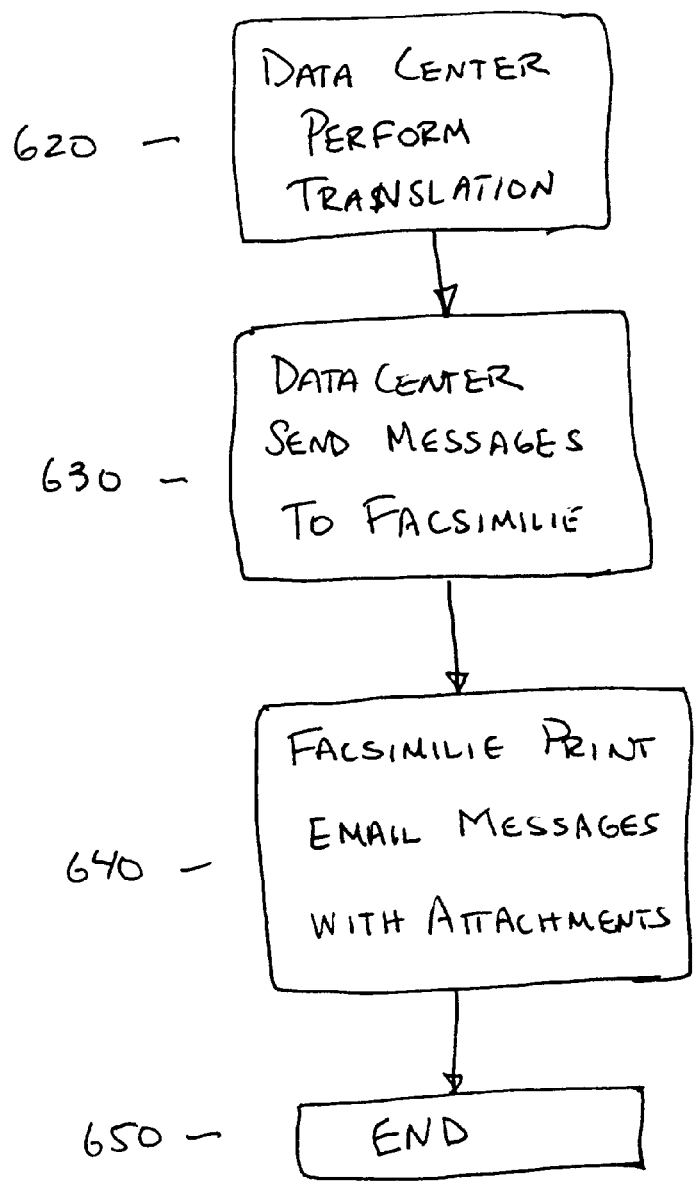
FIG. 7 is a continuation of the method flow of FIG. 6.

Now turning to FIG. 7, the method re-enters the method flow at path E and continues along to step 620 where data center 120 performs document transformation from e-mail format to facsimile format, i.e., a TIFF image, in order to successfully transmit the message to facsimile 150. The data center 120 also translates selected attachments which are formatted in various program applications as needed, such as a TIFF format. The method proceeds to step 630 where data center 120 routes the message to the facsimile number. At step 640, facsimile 150 receives and prints the message. The method ends at step 650.

Figure 8:
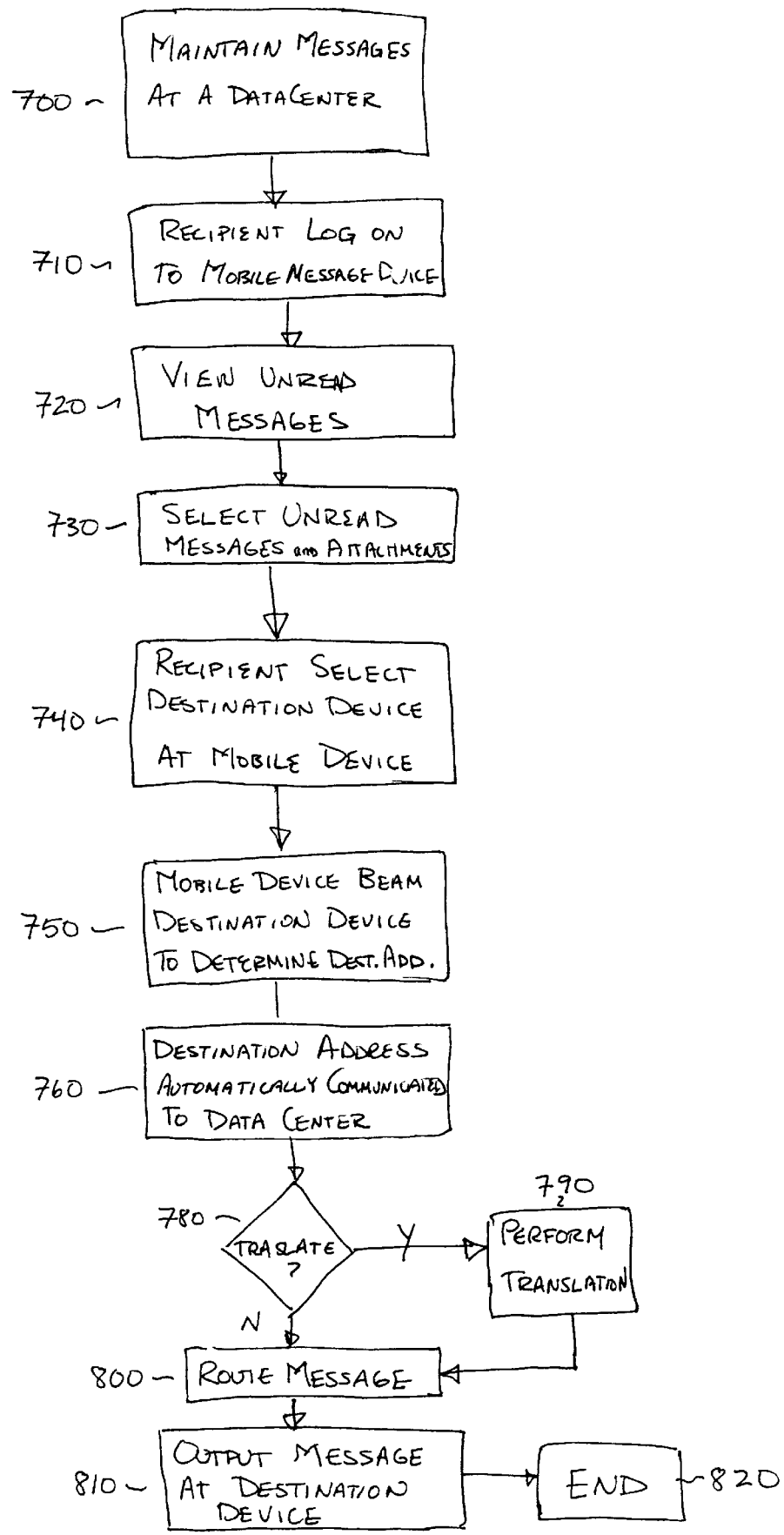
FIG. 8 is a flow chart of yet another embodiment of the present invention.

Now turning to FIG. 8, there is shown a flow chart depicting the method flow of the present invention where unread and undeleted messages are stored at data center 120. The method flow begins at step 700 where the message is stored at data center 120. The method proceeds to step 710 where the recipient logs on to mobile device 130. At step 720, recipient views the list of unread messages and selects a message at step 730. At step 740, the recipient selects a destination device for receiving the message.

Continuing to step 750, the recipient places the mobile device within wireless range of wireless communication tag 140 located on destination device 150 to effect communication of the destination address to mobile device 130. At step 760, the destination device address is automatically communicated to data center 120. The method progresses to step 780 where data center 120 is queried as to whether or not translation or transcoding of the message is required. If the answer to the query at step 780 is "yes," then data center 120 performs translation, and the method proceeds to step 800. If, however, the answer to the query at step 780 is "no," then the method proceeds directly to step 800 where the message is routed to destination device 150. From step 800, the process continues at step 810 where the message is received and processed by destination device 150. The method ends at step 820. It is to be appreciated that, although this invention has been described as using mobile devices, it may also be implemented using a desktop system by manually entering the destination addresses, if so desired.

While the present invention has been disclosed and described with reference to a single embodiment thereof, it will be apparent, as noted above, that variations and modifications may be made therein. The above specification describes a new and improved system and method for remote receipt of a message, such as a telephone, e-mail, facsimile or paper message. It is realized that the above description may indicate to those skilled in the art additional ways in which the principles of this invention may be used without departing from the spirit of the invention. Therefore, it is intended that this invention be limited only by the scope of the appended claims.

What is claimed is:

1. A method for retrieving a message remotely comprising the steps of:

(a) storing at least one message for a recipient at a data center;

(b) sending a notification from said data center to a recipient's mobile device said notification indicating that said at least one message exist at said data center;

(c) communicating between said recipient's mobile device and a wireless tag, wherein said recipient's mobile device retrieves from said tag a destination device and a destination address;

(d) sending said destination device address to said data center;

(e) having said data center ask said recipient's mobile device to select whether said recipient would like said message to be sent securely or normally;

(f) sending said message to said destination device address securely if selected by said recipient or sending said message to said destination device normally if selected by said recipient; and (g) translating said stored messages to a format compatible with a destination device.

2. The method of claim 1 further including sending a confirmation notification to said device that said message was sent to said destination device address.

3. The method of claim 1 further including printing said message at said destination device.

4. The method of claim 1, further including the step of determining a recipient.

5. The method of claim 4, further including the step of determining said recipient preferences and sending said message according to said recipient preferences.

6. The method of claim 1 sending a return receipt to said original sender.

7. The method of claim 1 wherein said mobile device is a personal data assistant.

8. The method of claim 1 wherein said messages are delivered securely and stored until said recipient retrieves said messages.

9. The method of claim 1 wherein said mobile device is a cell phone.

10. The method of claim 1 wherein said mobile device is a laptop computer.

11. The method of claim 1 wherein said mobile device is a pager.

12. The method of claim 1, wherein said message is a facsimile message.

13. The method of claim 1, wherein said destination device is a photocopier.

14. The method of claim 1, wherein said destination is a facsimile machine.

15. The method of claim 1, wherein said destination is a printer.

16. The method of claim 1, wherein said message is an e-mail.

17. The method of claim 1, wherein said message is a voice signal communication.

18. The method of claim 1, wherein said message is any electronic data message.

19. The method of claim 1, wherein said communication is by IrDA.

20. The method of claim 1, wherein said communication is by Rf.

21. The method of claim 1, wherein said communication is ultrasonic.

22. The method of claim 1, wherein the destination address also includes information about a message format required by said destination device for delivery.

23. The method claimed in claim 1, wherein said message is secured by public key encryption.

24. The method claimed in claim 1, wherein said message is secured by private key encryption.

25. A method for retrieving a message remotely comprising the steps of:

(a) sending a message to a recipient;

(b) said message routed to a data center, said data center determining recipient preferences;

(c) sending a notification, in accordance with recipient preferences, from said data center to a recipient's mobile device, said notification indicating that said message exists at said data center;

(d) communicating between said recipient's mobile device and a wireless tag, wherein said recipient's mobile device retrieves from said tag a destination device and a destination address;

(e) sending said destination device address to said data center;

(f) having said data center ask said recipient mobile device to select whether said recipient would like said message to be sent securely or normally;

(g) converting said stored message to a format compatible with a destination device; and (h) sending said converted message to said destination device address securely if selected by said recipient or sending said message to said destination device normally if selected by said recipient.

26. A method for retrieving a message remotely comprising the steps of:

(a) storing a message at a data center; said data center determining said recipient and recipient preferences;

(b) sending a notification, in accordance with recipient preferences, from said data center to a recipient's mobile device, said notification indicating that said message exists at said data center;

(c) communicating between said mobile device and a wireless tag, wherein said recipient's mobile device retrieves from said tag a destination device and a destination address;

(d) sending said destination device address to said data center;

(e) having said data center ask said recipient's mobile device to select whether said recipient would like said message to be sent securely or normally;

(f) converting said stored message to a format compatible with a destination device; and (g) sending said converted message to said destination device address securely if selected by said recipient or sending said message to said destination device normally if selected by said recipient.

27. A method and system as claimed in claim 26, further including printing at said destination device said message.

* * * * *